Sept. 2, 1958 A. ROWLEY 2,850,228
BLOWER
Filed Oct. 30, 1956 2 Sheets-Sheet 1
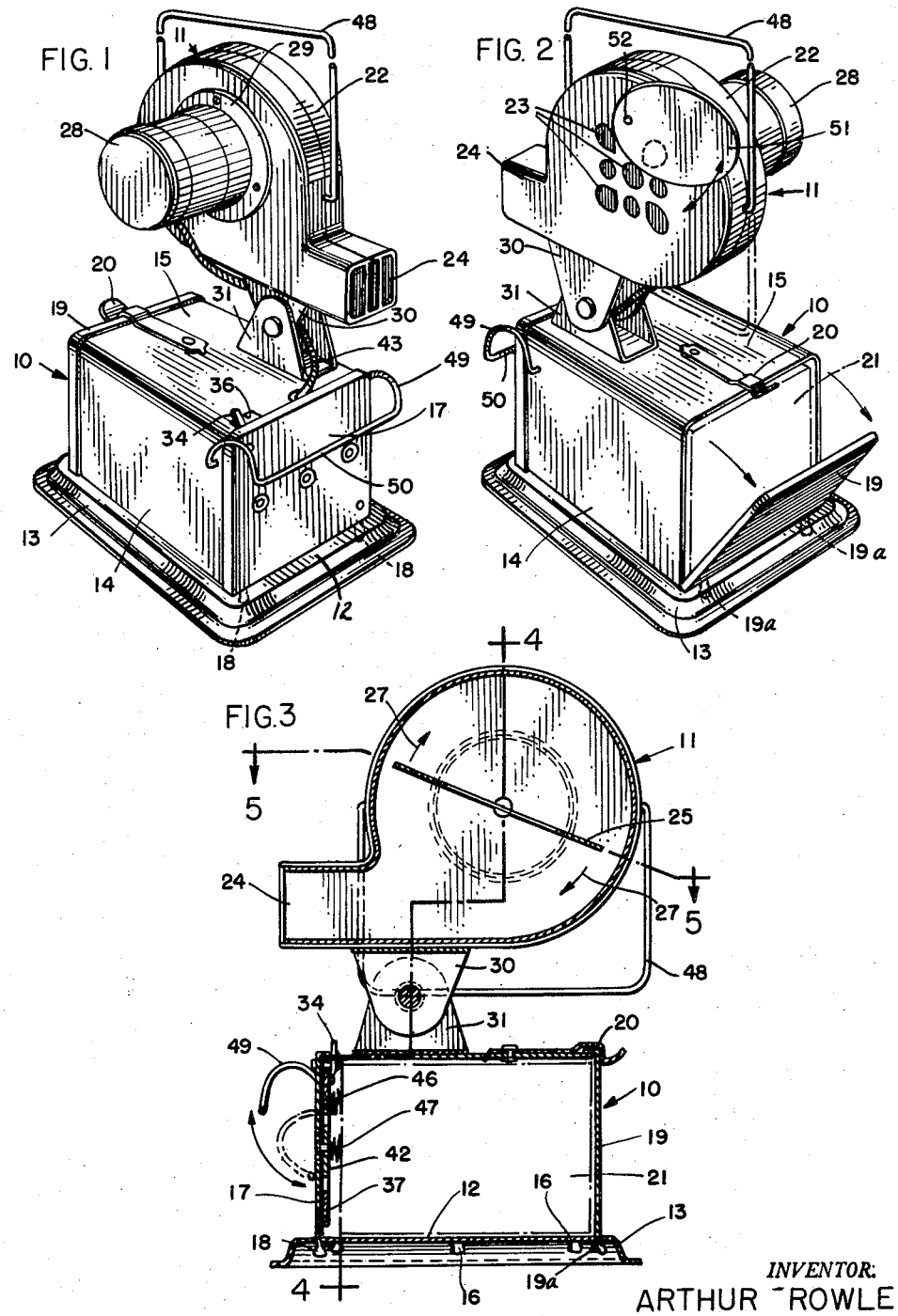

Sept. 2, 1958 — A. ROWLEY — 2,850,228
BLOWER
Filed Oct. 30, 1956 — 2 Sheets-Sheet 2

INVENTOR:
ARTHUR ROWLEY
BY
Mazzall, Johnston, Cook & Root.
ATT'YS

United States Patent Office 2,850,228
Patented Sept. 2, 1958

2,850,228
BLOWER

Arthur Rowley, Green Lake, Wis.

Application October 30, 1956, Serial No. 619,235

4 Claims. (Cl. 230—117)

This invention relates to a portable apparatus capable of generating a circulation of air, and more particularly to a portable battery-operated blower unit for use in creating a downdraft over the top of a mass of ignited combustible matter to enhance the burning thereof. This invention is especially useful in connection with building fires in portable grills, picnic fireplaces, barbecue pits, and other similar fire pots.

By way of specific example, the portable blower unit of the present invention may be mounted at the side of a fireplace or grill for directing air over ignited charcoal or kindling to enhance the building of a charcoal or other fire.

In the present invention, a battery housing is provided having a cover at one end for access therein facilitating the insertion of a battery, and a motor-operated blower pivotally carried atop of the battery housing. The blower will be provided with an axial intake and a tangential exhaust wherein the blower-generated air may be directed along a vertical plane according to the desires of the operator. Suitable electrical connections between the motor and the battery permit selective energization of the blower unit. A substantially U-shaped member, pivotally mounted at its very ends on the blower housing, defines a carrying handle to facilitate the transporting of the unit. A wire hanger is pivotally secured to one end of the battery housing for coaction therewith so that the entire unit may be suspended on the edge of a substantially upstanding plate such as the edge of a portable grill. In order to adjust the output of the blower, a movable baffle is mounted to be selectively swung over any part of the blower intake.

Accordingly, it is an object of this invention to provide a portable apparatus capable of generating the circulation of air.

Another object of this invention resides in the provision of a portable blower unit adapted to be used in connection with building of a fire, wherein a downdraft is created over the top of the fire.

Still another object of this invention is in the provision of a portable blower unit operated from a battery.

A further object of this invention is to provide a portable battery-operated blower or fan unit having a hanger for facilitating the detachable mounting of a unit on the side of a portable grill.

A still further object of this invention is in the provision of a portable blower unit, wherein the blower is of the centrifugal type having an axial intake and a tangential exhaust, and means is provided for adjusting the air flow through the exhaust.

Another object of this invention is to provide a portable blower unit including a centrifugal blower having an axial intake and a tangential exhaust, wherein a swingable baffle is mounted on the blower casing for adjustably covering the intake to thereby regulate the airflow through the exhaust.

Other objects, features, and advantages of the invention will be apparent from the following detailed disclosure, taken in conjunction with the accompanying sheets of drawings, wherein like reference numerals refer to like parts, in which:

Fig. 1 is a perspective view of a portable blower unit embodying the present invention;

Fig. 2 is a perspective view of the embodiment shown in Fig. 1, taken from the opposite side, and illustrating the cover of the battery housing in partial open position;

Fig. 3 is a transverse sectional view of the blower unit, taken through the longitudinal axis of the blower and the battery housing;

Figure 4:
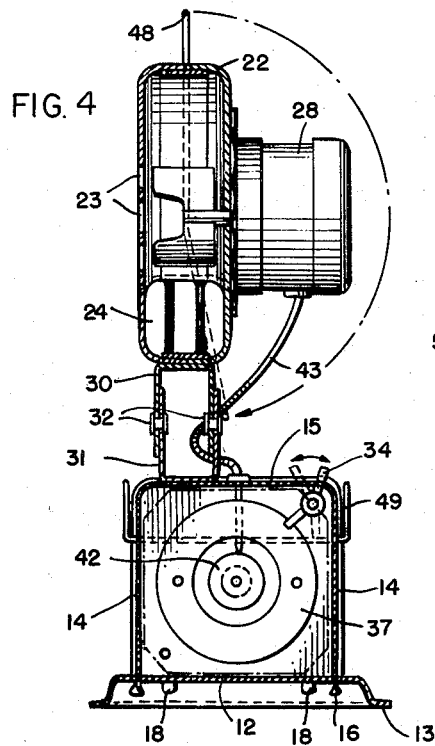
Fig. 4 is a sectional view, with some parts shown in elevation, taken substantially along line 4—4 of Fig. 3.
Figure 5:
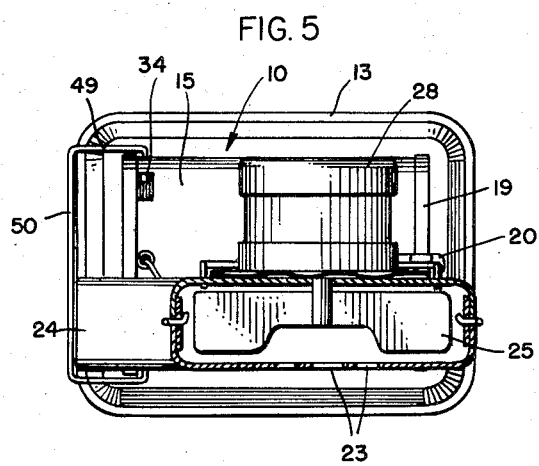
Fig. 5 is a sectional view, showing some parts in top plan, taken substantially along the line 5—5 in Fig. 3.

The portable blower unit of the present invention includes generally a battery housing 10, and a motor driven blower 11 pivotally supported on top of the housing.

The battery housing 10 is substantially rectangular in shape and includes a flat bottom 12. At the marginal edges of the bottom downturned peripheral flanges 13 serve to define the bottom as a base and adapting it to be positioned or placed on a flat surface. Upstanding side walls 14, 14 merge with a top 15 to define with the bottom 12 the battery housing 10. In order to secure the side walls to the bottom 12, extending lugs 16 are received in suitable slots in the bottom 12 and twisted to form locking members. One end of the housing is closed by an end wall 17 which is also provided with a plurality of lugs 18 extending through slots in the bottom 12 and being twisted to hold the end wall in position. Any suitable means may be provided to secure the top edge of the end wall 17 to the top 15, such as by spot-welding or the like. The other end of the housing is provided with a cover 19 pivotally secured to the bottom 12 by lugs 19a extending through slots in the bottom and being held in closed position by a resilient latch 20 secured to the housing top 15. Lifting of the latch 20 allows the cover 19 to swing out and down and provide access to the interior of the batery housing for insertion of a battery 21. In the instant case, a lantern battery is employed to power the blower 11, but it is to be understood that other arrangements may be provided such as a bank of flashlight batteries.

The blower 11 is of the centrifugal type, and includes a housing 22 having an axial inlet or intake defined by a plurality of openings 23 and a tangential outlet or exhaust 24. Within the blower housing 22, an impeller 25 is rotatably mounted on a shaft 26 for rotation in the direction of the arrows 27, as shown in Fig. 3.

Secured at the side of the blower housing opposite the inlet 23 is an electrical motor 28, whose drive shaft is mechanically connected to the impeller shaft 26 in any suitable manner. The housing of the motor 28 is provided with a flange at one end which bears against the blower housing and is secured thereto by fasteners 29, as seen in Fig. 1.

In order to pivotally mount the blower 11 on the battery housing 10, an inverted U-shaped bracket 30 is secured to the blower housing 22 which coacts with a similarly shaped upstanding U-shaped member 31 secured to the top 15 of the battery housing 10. The legs of these U-shaped members interengage and are pivotally secured to each other by rivets or eyelets 32, 32. This arrangement enables the exhaust or outlet 24 of the blower unit to be variably position so that the generated airflow may be directed at various heights.

Figure 6:
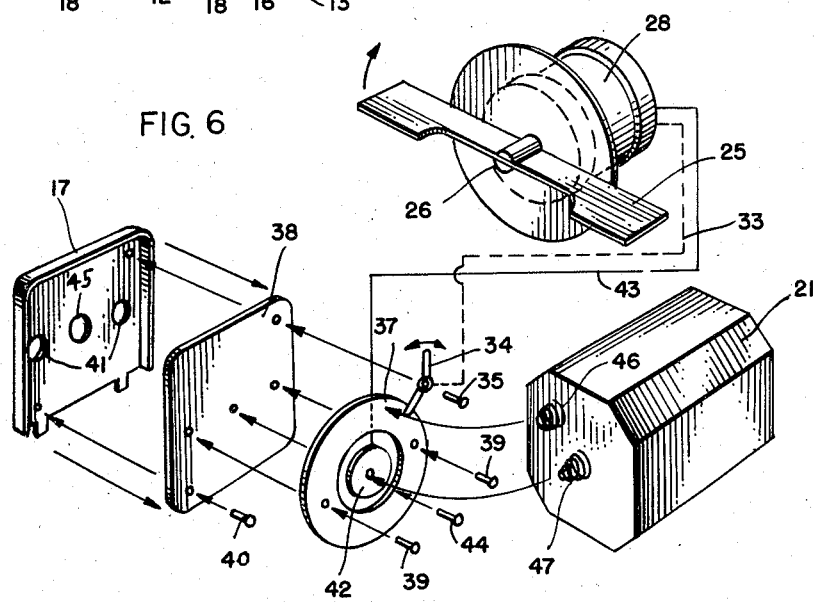
Fig. 6 is a detailed and partially exploded view of a portion of the battery housing and the blower assembly, illustrating the electrical hookup between the battery and the motor.

In electrically connecting the motor 28 to the battery 21, the material of which the entire blower unit is constructed will be utilized. In this regard, the battery housing, the U-shaped supports 30 and 31, the blower housing 22 and the housing of the electric motor 28 are constructed of metal capable of conducting electricity. Wherein it will be understood that the motor 28 will conventionally have a pair of electrical terminals, one terminal will be connected to these elements or the framework of the blower unit and the battery housing which may be defined as ground. Referring specifically to Fig. 6, the ground is shown by the dotted line 33 and is seen to lead to a switch member 34 pivotally secured to the end wall 17 by means of a current carrying rivet 35. In other words, the switch member communicates with ground through the metal framework of the entire unit. A slot 36 is formed in the top 15 of the battery housing to allow one end of the switch to extend outside of the housing for manipulation by the operator. The other end of the switch is positioned so that it may selectively engage a metal annulus or ring 37 which is mounted within the battery housing and secured to a sheet of insulating material 38 by fasteners 39. The insulating material is, in turn, secured at opposite corners to the inside surface of the end wall 17 by the rivet 35 which pivotally supports the switch 34 and a rivet 40. Apertures 41 are provided in the end wall 17 of such size as to receive the one end of rivets 39 so that they do not come in contact with the end wall. Thus the annulus 37 is completely insulated from the ground.

The other terminal of the motor is connected to a metal disk 42 by means of a wire 43. This disk is secured to the insulating sheet or panel 38 by a rivet 44. An aperture 45 is provided in the end wall 17 of such size as to freely receive one end of the securing rivet 44 in order to prevent contact on a short circuit between the disk 42 and the grounded housing of the unit.

The battery 21 of the type illustrated includes spring type terminals 46 and 47 one of which is arranged to contact the disk 42 and the other of which is arranged to contact a point on the annulus 37, as shown in Fig. 3. Thus, terminal 47 of the battery will be at all times connected to one terminal of the motor 28 through the disk 42 and the conductor 43, while the terminal 46 may be selectively connected to the other terminal of the motor in order to complete the electric circuit by means of the annulus 37, the pivotally mounted switch 34 and the framework of the unit which is connected to the other terminal of the motor 28. Therefore, on-off control of the blower may be provided upon manipulation of the switch 34.

Viewing Figs. 1, 2, 4 and 5, it will be noted that the supporting U-shaped members 30 and 31 are positioned at one end and at one side with respect to the battery housing 10 thereby positioning the blower 11 at one side of the battery housing. It may be further noted that the electric motor 28, which is secured to the blower housing 22, extends from the side of the blower which positions the motor over the battery housing. Due to this arrangement, a balance of the entire unit may be attained whereby a wire carrier or hanger 48 of substantially U-shape has its ends pivotally related with respect to the blower housing 22. As shown in Fig. 4, the wire hanger 48 may be pivoted in an up position, as shown in dotted lines, for carrying the unit or allowed to fall to a lower position, as shown in solid lines, when the unit is supported on a flat surface.

A second wire hanger or support 49 is provided with ends pivotally associated with the opposite side walls 14, 14 of the battery housing 10 and provided with inverted substantially U-shaped bars which are horizontally alined and connected at their outer ends by a cross bar 50, as shown most clearly in Figs. 1 to 5. In use, this wire hanger 49 coacts with the adjacent portions of the battery housing 10 to provide a detachable clamp which may overlie an upstanding edge of the first pot or bowl of a portable grill. In such usage, the outlet 24 of the blower would be positioned above the edge of the fire pot and pivotally adjusted to create a downdraft over the top of the fire. In building a fire in such a portable grill, the time consumed for the building operation is substantially lessened by use of the present invention.

In some applications, it may be desirable to adjust the output airflow from the blower 11. For this purpose, a baffle plate 51 (see Fig. 2) is pivotally mounted at 52 on the side of the blower housing where the inlet openings 23 are located. Swinging the baffle plate 51 around the pivot 52 and over one or more of the inlet openings 23 variably restricts the intake and thereby reduces the exhaust through the outlet 24. In other words, the airflow through the exhaust 24 may be regulated according to the needs of the particular situation.

Other usages of the present invention include the building of a fire in a fireplace or an outdoor barbecue pit, wherein the entire blower unit may be supported on a flat surface at one side of the fire.

It will be understood that modifications and variations may be effected without departing from the scope of the novel concepts of the present invention, but it is understood that this application is to be limited only by the scope of the appended claims.

I claim:

1. A portable battery-operated blower unit comprising a battery housing adapted to serve as a base for said blower, said housing having a cover at one end for providing access thereto, a centrifugal blower pivotally mounted on the top of said housing and at one side thereof, said blower including a housing having an axial intake and a tangential exhaust, an impeller in said housing rotatably mounted on a horizontal axis, an electric motor having a casing secured to said blower housing and a drive shaft mechanically connected to said impeller for driving same, said motor extending from the side of the blower housing as to substantially overlie said battery housing, an annular conductor secured within said battery housing at one end thereof but being insulated therefrom for contacting one terminal of a battery carried in said battery housing, a disk-shaped conductor inside of said annular conductor secured in insulating relationship to said one end of the battery housing, one of said conductors being electrically connected to one terminal of said motor, said other terminal of said motor being electrically connected to said battery housing, and a switch electrically connected with said battery housing for electrically connecting said battery housing and said other conductor.

2. A portable battery-operated blower unit comprising a battery housing adapted to serve as a base for said blower, said housing having a cover at one end for providing access thereto, a centrifugal blower pivotally mounted on the top of said housing and at one side thereof, said blower including a housing having an axial intake and a tangential exhaust, an impeller in said housing rotatably mounted on a horizontal axis, an electric motor having a casing secured to said blower housing and a drive shaft mechanically connected to said impeller for driving same, said motor extending from the side of the blower housing as to substantially overlie said battery housing, circuit means for electrically connecting said motor to a battery carried in said battery housing, a substantially U-shaped member having its ends pivotally connected to said blower housing defining a carrying handle for said unit, and a clip pivotally carried at one end of said battery housing for coacting with said housing in defining a hanger for detachably mounting said unit on a substantially vertically extending wall.

3. A portable battery-operated blower unit comprising a battery housing adapted to serve as a base for said blower, said housing having a cover at one end for providing access thereto, a centrifugal blower pivotally mounted on the top of said housing and at one side thereof, said blower including a housing having an axial intake and a tangential exhaust, baffle means selectively movable over said intake for regulating the flow of air through said exhaust, an impeller in said housing rotatably mounted on a horizontal axis, an electric motor having a casing secured to said blower housing and a drive shaft mechanically connected to said impeller for driving same, said motor extending from the side of the blower housing as to substantially overlie said battery housing, circuit means for electrically connecting said motor to a battery carried in said battery housing, a substantially U-shaped member having its ends pivotally connected to said blower housing defining a carrying handle for said unit, and a clip pivotally carried at one end of said battery housing for coacting with said housing in defining a hanger for detachably mounting said unit on a substantially vertically extending wall.

4. A portable battery-operated blower unit comprising a battery housing adapted to serve as a base for said blower, said housing having a cover at one end for providing access thereto, a centrifugal blower pivotally mounted on the top of said housing and at one side thereof, said blower including a housing having an axial intake and a tangential exhaust, an impeller in said housing rotatably mounted on a horizontal axis, an electric motor having terminals, a casing secured to said blower housing and a drive shaft mechanically connected to said impeller for driving same, said motor extending from the side of the blower housing as to substantially overlie said battery housing, a conductor secured within said battery housing at one end thereof but being insulated therefrom from contacting one terminal of a battery carried in said battery housing, a second conductor inside of said housing and secured in insulating relationship to said one end of the battery housing, one of said conductors being electrically connected to one terminal of said motor, another terminal of said motor being electrically connected to said battery housing, and a switch electrically connected with said battery housing for electrically connecting said battery housing and said other conductor.

References Cited in the file of this patent
UNITED STATES PATENTS

| | | |
|---|---|---|
| 828,383 | Cannon | Aug. 14, 1906 |
| 1,108,053 | Fassett | Aug. 18, 1914 |
| 1,254,042 | Howe | Jan. 22, 1918 |
| 1,832,899 | Frederics | Nov. 24, 1931 |
| 2,201,506 | Smith | May 21, 1940 |
| 2,432,067 | Morse | Dec. 2, 1947 |
| 2,595,406 | Popovich | May 6, 1952 |
| 2,711,287 | Russell | June 21, 1955 |

FOREIGN PATENTS

| | | |
|---|---|---|
| 476,291 | Great Britain | July 21, 1937 |
| 557,890 | Great Britain | July 8, 1943 |